United States Patent [19]

Hatlestad et al.

[11] Patent Number: 5,621,460

[45] Date of Patent: Apr. 15, 1997

[54] OPTICAL DIFFERENTIATION BETWEEN PLANTS AND BACKGROUND UTILIZING A SINGLE CCD CAMERA

[75] Inventors: John D. Hatlestad, Burnsville; Gerald F. Sauter, Eagan, both of Minn.

[73] Assignee: Lockheed Martin Corporation, Bethesda, Md.

[21] Appl. No.: 496,615

[22] Filed: Jun. 29, 1995

Related U.S. Application Data

[63] Continuation of Ser. No. 321,568, Oct. 11, 1994, abandoned.

[51] Int. Cl.$^6$ .................................................. H04N 9/097
[52] U.S. Cl. .......................................... 348/265; 348/337
[58] Field of Search .................................. 348/262, 265, 348/336, 337, 338

[56] References Cited

U.S. PATENT DOCUMENTS

| | | | |
|---|---|---|---|
| 3,922,069 | 11/1975 | Kishikawa et al. | 348/338 |
| 4,323,918 | 4/1982 | Bendell | 348/337 |
| 4,926,249 | 5/1990 | Ichihara et al. | 348/337 X |
| 4,933,751 | 6/1990 | Shinonaga et al. | 348/337 X |
| 5,051,821 | 9/1991 | Vittot et al. | 348/164 X |
| 5,132,802 | 7/1992 | Osthues et al. | 358/213.28 |
| 5,353,053 | 10/1994 | Nishioka et al. | 348/164 X |

*Primary Examiner*—Wendy Garber
*Attorney, Agent, or Firm*—Glenn W. Bowen

[57] ABSTRACT

An optical system for detecting vegetation with the use of a single image sensor, such as a charge coupled device (CCD) camera is provided by optical elements which project separate red and near infrared (NIR) images onto the CCD camera. The camera then can supply output signals representative of the two images to a signal processing device that determines the nature of the vegetation that provided the original image. Embodiments are described where the imaging sensor utilizes unitary optical splitters to provide wide-angle separate images. In another version a single lens and a group of mirrors provide a narrow-angle telescope device. Another version includes two separate lens, red and NIR filters, each adjacent to one of the lenses so as to project an image on separate areas of the CCD camera.

9 Claims, 5 Drawing Sheets

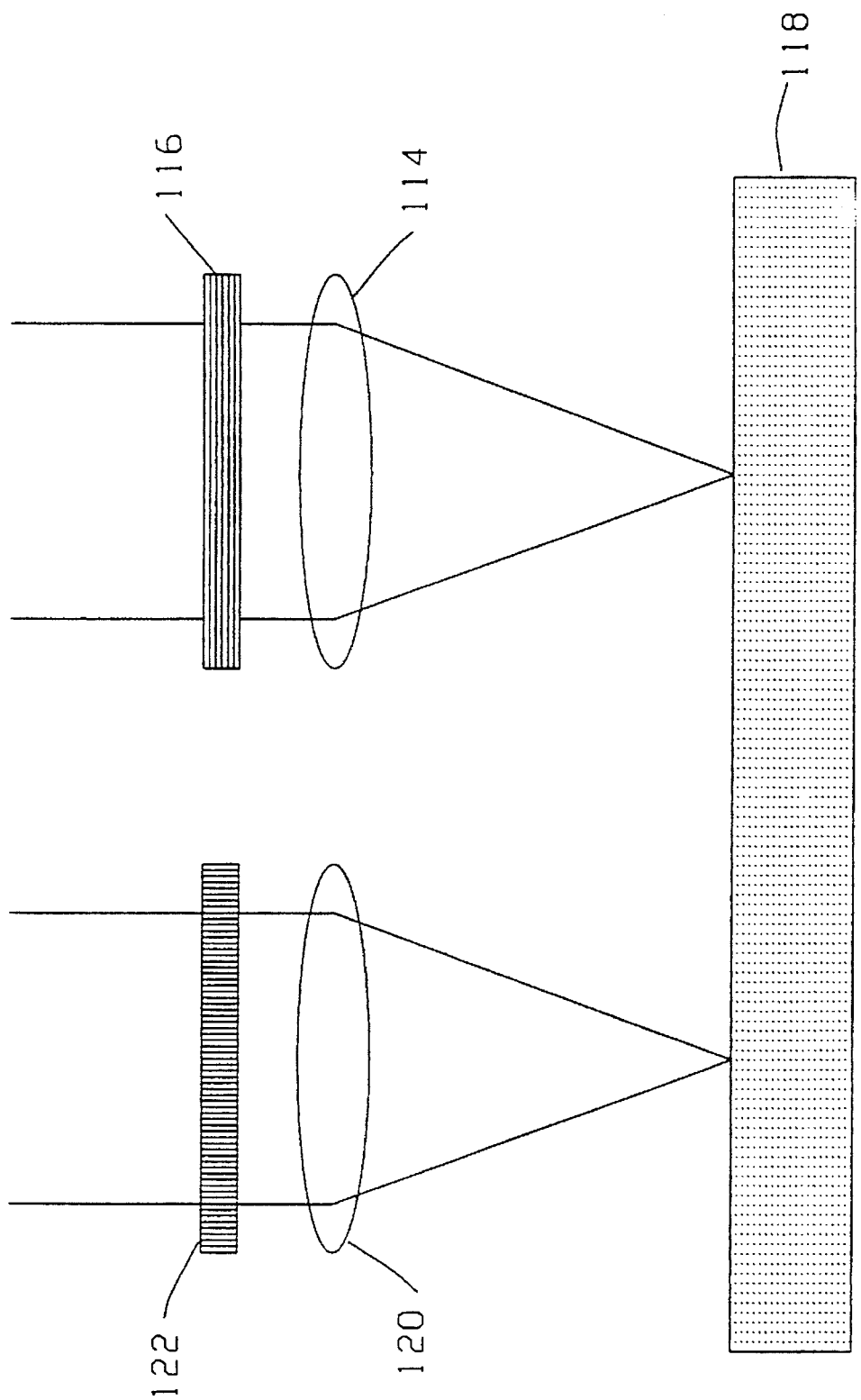

OPTICAL DIFFERENTIATION BETWEEN PLANTS AND BACKGROUND UTILIZING A SINGLE CCD CAMERA

This is a continuation application of Ser. No. 08/321,568, filed Oct. 11, 1994, which will be abandoned by non-prosecution as of the filing date of the present application.

BACKGROUND OF THE INVENTION

Field of the Invention

The invention relates to the detection of high contrast images of objects, and in particular to the utilization of an optical system that employs a single CCD camera to differentiate between desired crops and weeds and other noxious plants for the purpose of controlling the spray of herbicide and fertilizer.

A major change is now occurring in the agricultural community. This change is called "precision farming," "computer-aided farming" or "site-specific crop management." Instead of using an average value for the entire field and applying chemicals accordingly, vehicle management and location, a real-time analysis of soil chemical composition, computer control of product application and crop yield measurements to the resolution of few meters, are all being investigated to improve yields, lower costs and to lessen environmental concerns.

The difficulty of utilizing infrared (IR) imaging devices for the detection of cold targets is recognized in U.S. Pat. No. 5,132,802 which issued Jul. 21, 1992 to Osthues et al entitled "High Contrast Image Apparatus Employing Optical Filters to Cause Each Image Pick-Up Element to have its Maximum Sensitivity in a Different Spectral Range." The apparatus of the Osthues et al patent is described in the embodiment which is directed to the detection of military objects which may be surrounded by natural vegetation and may be camouflaged.

The Osthues et al system utilizes two image pick-up means which are selected to have two different wavelength ranges. One of the wavelength ranges is selected so that the reflection characteristics of the object and of the surrounding natural vegetation are as similar as possible. In this patent the reflection from the vegetation is considered to be clutter. The second wavelength is selected so that there is the greatest possible difference between the reflection behavior or the object to be detected and that of the vegetation.

Two separate CCD (Charge-Coupled Device) cameras are utilized so that each camera receives and operates on one of the two wavelengths. The first wavelength, which is selected so that the characteristics of the object and the natural vegetation are similar as possible, lies in the near infrared (NIR) range. This wavelength lies between 0.7 μm and 2 μm. The second wavelength, which is utilized to distinguish the background of the object, lies between 0.2 μm and 0.6 μm.

The Osthues et al patent shows two separate embodiments for implementation of that optical device. One of the implementations shows the use of two separate lens and filter combinations, each one of which is used to convey its image to a separate CCD camera. The second embodiment utilizes a single lens and two CCD cameras which are displaced so that one of the camera devices is positioned horizontally and the other is positioned vertically or at right angles. The light from the lens is then directed onto an optical beam-splitter. The beam-splitter splits the beam and directs a portion of it onto a filter providing the first wavelength to one of the cameras and a different filter for providing the second wavelength to the other camera.

It is well known that the ratio of the reflection of light from the near-infrared (NIR) and the red (R) portions of the spectrum is a reliable detector of living plants against various backgrounds of soil and crop residue. For example, in the article "Visible and Near-Infrared Plant, Soil, and Crop Residue Reflectivity for Weed Sensor Design" by B. Nitsch et. al. in the ASAE Proceedings of the 1991 International Summer Meeting at Albuquerque, N.M., on Jun. 23–26, 1991, Paper No. 913006, the ratio of NIR/R is called the "vegetative index." Another alternative ratio that is useful is (NIR–R)/(NIR+R) which is termed the normalized difference ratio is described in this same article. The ratio of NIR/R may be utilized where the NIR is obtained from a portion of the spectrum from approximately 700 nm to 800 nm, and the red is obtained from a region around 600 nm. This may be used to differentiate plant growth from background soil and crop residue. Bandpass filters may be placed in front of photo-detectors to obtain the signals from the various spectral regions. This works well when the detection of living plants is the only requirement. However, when weed species must also be detected, identified and differentiated from the living crops, imaging techniques must be used. Two black and white CCD cameras with two separate filters could be used, but this can be a costly solution. In addition to the additional cost, this creates an alignment problem, especially on close objects since parallax errors will change the image alignment as a function of the distance of the object.

Another paper in the *Transactions of the ASAE* (American Society of Agricultural Engineers) is entitled "The Use of Local Spectral Properties of Leaves as an Aid for Identifying Weed Seedlings and Digital Images" by E. Franz, et al. It appeared in Volume 34(2): March–April 1991. This paper also discusses the use of NIR reflectance for plant discrimination and the use of a CCD camera and photographic filters to extract spectral data from vegetative and non-vegetative regions.

In order to be commercially feasible for agricultural applications, the utilization of expensive cameras and optical systems must be minimized. In addition, a system which utilizes more than one CCD camera tends to be bulky and somewhat unmanageable.

SUMMARY OF THE INVENTION

The present invention provides improved sensing apparatus which may be especially adapted to the detection of useful crops and to differentiate these from undesired weeds in order that the weeds may be selectively sprayed and the crops may be selectively provided with fertilizer and herbicide protection, etc. The invention also may be utilized, however, for various other purposes, such as the detection of military objects among camouflage and long distance detection of particular types of vegetation from among other background vegetation from airplanes or space vehicles. This may be used, for example, in the detection of the growing of plants for the manufacture of illegal drugs.

One embodiment of the invention is a wide-angle sensor that is useful for slow-moving agricultural vehicles. The embodiment is obtained by an optical splitter which is designed to provide a wide-angle view. In this embodiment light is obtained by reflection of fluorescence from a plant on which initial optical beam has been directed. This light is sent to an optical splitter that provides two identical images of the returned light so that each of the images appear across one-half the face of a CCD camera array.

One-half of the camera array has a red filter placed adjacent to it to allow the passage of light in the red wavelength region to the CCD array. The other half of the array has a Near Infra Red (NIR) filter placed adjacent to it to allow passage of the NIR wavelength region to the CCD array. The output of the CCD array thus provides an accurate measure of the relative amounts of NIR and R wavelengths received from the targeted images. This information can then be utilized to provide the vegetative index for the detection of and differentiation of useful crops and noxious plants. Utilization of different colored filters, of course, could be employed to obtain ratios, and other relationships, between two or more different wavelengths received from the image.

A second version of the invention utilizes a single lens and a series of mirrors that are arranged so that the image from the target first passes through the lens and is then directed toward the mirrors onto the color filters adjacent to the CCD array. This embodiment provides a narrow or telescopic view of the target and may be utilized for long range aircraft or spacecraft detection of vegetation.

Other applications are available for the invention, including the detection of military objects surrounded by vegetation, as in the Osthues patent, and also for the long distance detection of vegetation, such as for the detection of vegetation on distant planets by means of a space probe in which the size of the optical system must absolutely be minimized.

BRIEF DESCRIPTION OF THE DRAWINGS

The present invention is illustrated by reference to the drawings in which:

FIG. 7 is an illustration of a CCD array arrangement in which an NIR filter and a red filter are placed adjacent to the lenses which receive the image from the target which directs the light onto the CCD array.

DETAILED DESCRIPTION OF THE PREFERRED EMBODIMENT

The first described embodiment of the present invention is a wide-angle imaging version which receives light from a target. In the preferred embodiment the target is a mixture of crops and noxious plants, and the invention is used to distinguish between them for agricultural purposes.

Figure 1:
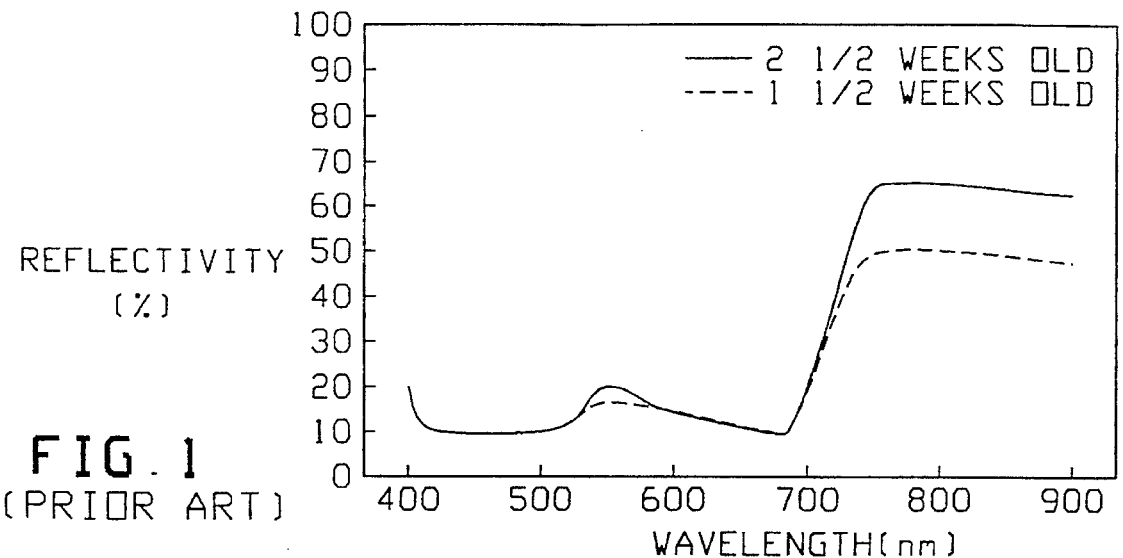
FIG. 1 is a graph of wavelength versus reflectivity that shows the spectral reflectivity from pigweed.

FIG. 1 is an illustration, for example, of spectral reflectivity from pigweed in full natural lighting. It is seen from this graph that reflectivity is relatively constant between 400 and 700 nm, At 700 nm, however, the reflectivity rises sharply to about 760 nm and again remains relatively flat. It is also noted that the age of the pigweed from germination can be determined from this graph since, as the pigweed ages, its reflectivity increases substantially as shown by the dotted line at 1½ weeks old to the solid line at 2½ weeks old.

Figure 2:
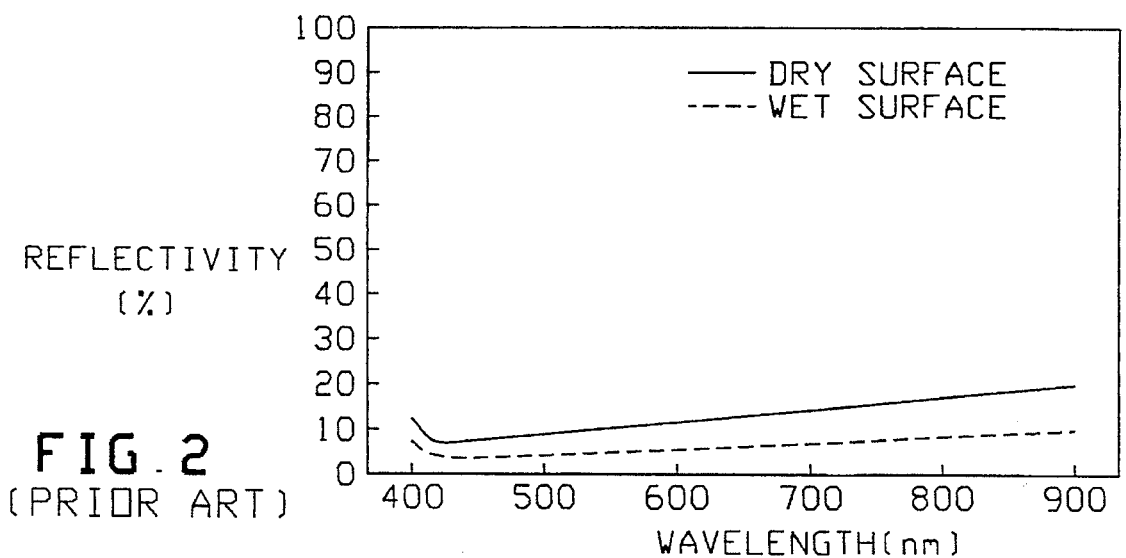
FIG. 2 is a graph of wavelength versus reflectivity which shows the spectral reflectivity from soil.
Figure 3:
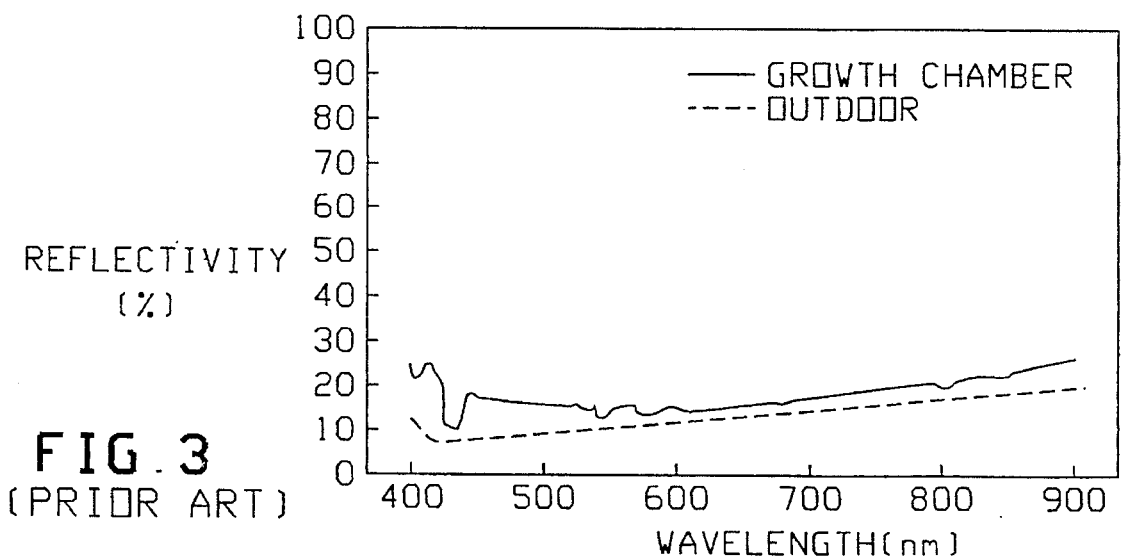
FIG. 3 is a graph of wavelength versus reflectivity which shows spectral reflectivity from crop residue.

Since soils themselves have spectral reflectivity, it must also be measured and determined. FIG. 2 is a graph which shows that the reflectivity of the soil gradually increases from about 425 nm up past 900 nm. It also illustrates that a dry surface will show more reflectivity than a wet surface, all of which are desirably taken into account in a precise detection system. FIG. 3 is graph which shows the spectral reflectivity from crop residue. It is noted that there is a tendency to an increase in reflectivity from about 425 nm to beyond 900 nm. Two graphs are shown, one for reflectivity from crop in a growth chamber and one for outdoors.

Figure 4:
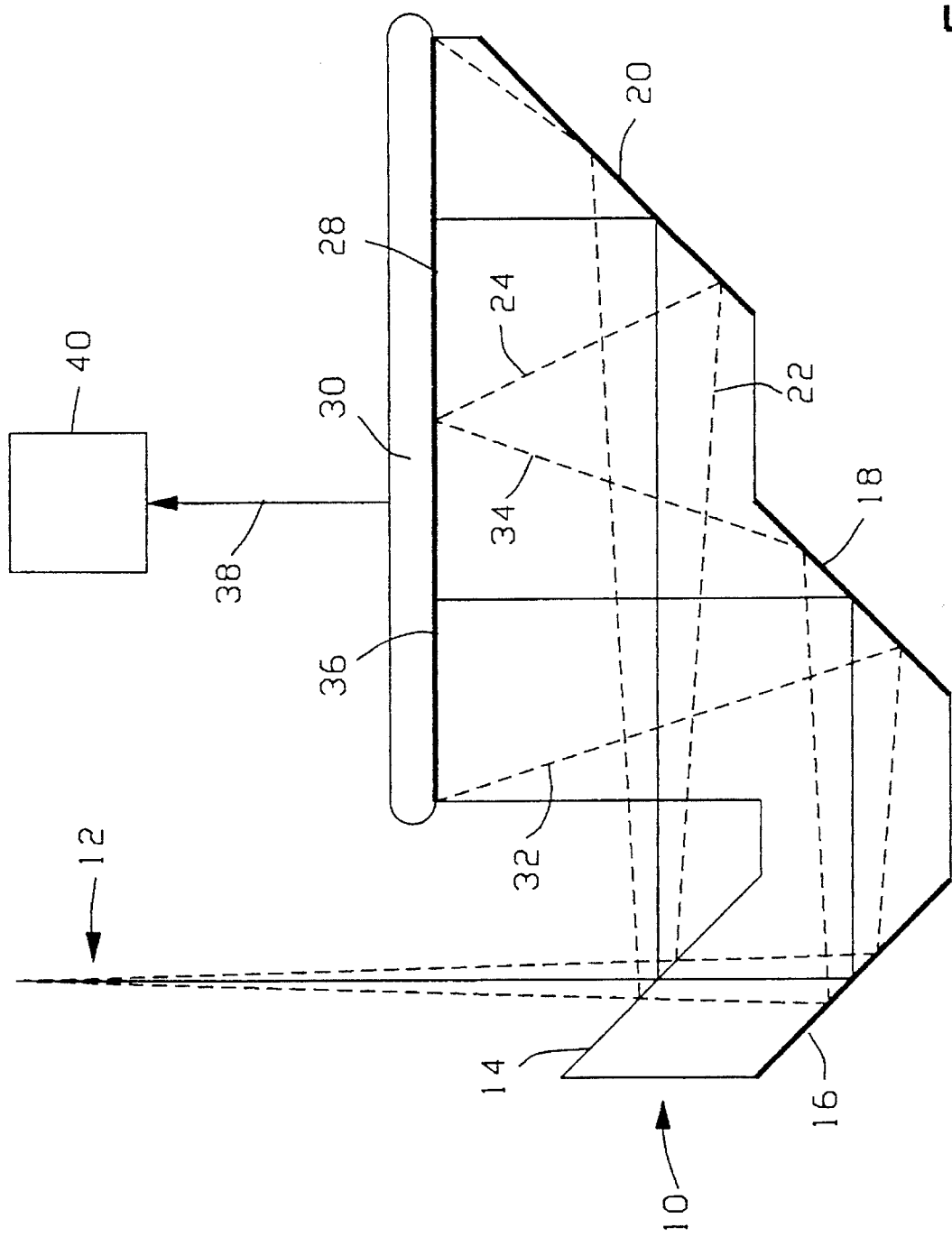
FIG. 4 is a side illustration of a wide-angle optical splitter, NIR filter, a red filter in a CCD camera array suitable for agricultural use.

FIG. 4 illustrates an optical splitter in which the incoming beam 12, which is returned by reflectance, or possibly fluorescence, is received from a target area. The optical splitter consists of half-silvered mirror 14 which is secured in or formed as a part of a transparent optical material 22. The incoming beam 12 is directed onto the half-silvered mirror 14, where approximately 50% of it is deflected from the surface of this mirror and the other 50% is passed on to the mirror 16. The portion of the reflected beam from the mirror 14 is again reflected by the mirror 20 so that its image is indicated by the dotted lines 24, 26, which define the respective area of the image that is directed onto the filter 28 which allows the red wavelength portions of the filter to be passed on to the charged couple device (CCD) camera 30.

The portion of the beam which passes through the half-silvered mirror is reflected by the mirror 16 and again reflected by the mirror 18. The outer areas of the image indicated by the dotted lines 32 and 34 define the area of this image on the filter 36. The filter 36 allows for the passage of NIR signals to the CCD camera 30. The output of the CCD camera is sent on the line 38 to conventional signal processing apparatus. In this manner a precise relationship between NIR and R may be established without a parallax error and without the necessity of aligning images on a pixel by pixel basis.

Figure 5:
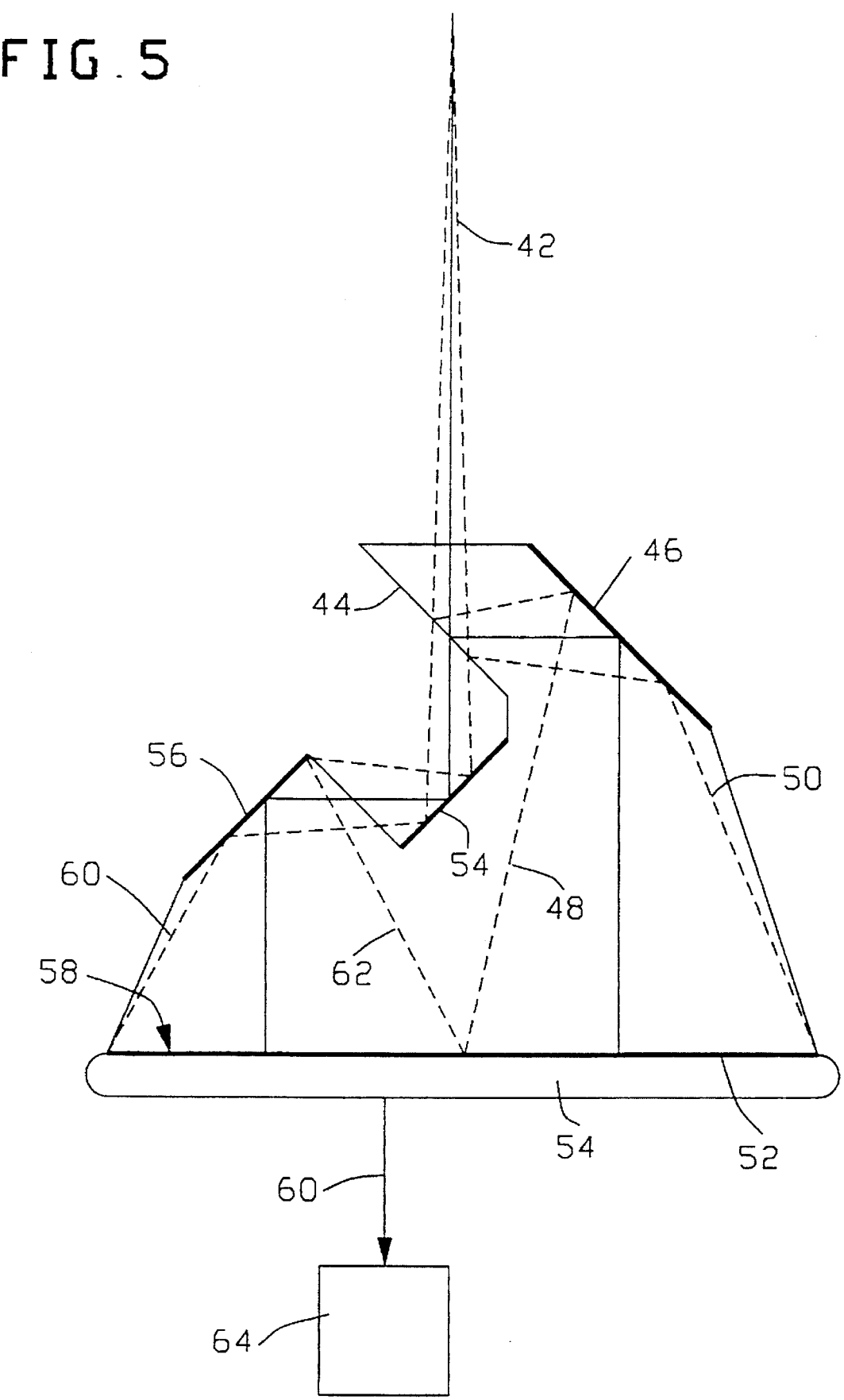
FIG. 5 is a side view of an alternate optical splitter which is utilized with an NIR, a red filter and CCD camera array to provide a wide angle view.

An alternate version of this wide-angle imaging system which is suitable for mounting on slow-moving agricultural vehicles is illustrated in FIG. 5. In FIG. 5 the incoming beam 42 again encounters a half-silvered mirror 44 which allows half of the light to pass through and the other half to be directed so that it is reflected by the mirror 46. In this illustration the mirror 46 directs its image, the outer extremes of which are indicated by the dotted lines 48 and 50, onto the filter 52 which allows for passage of the red wavelength into the CCD area 54. The light passing through the half-silvered mirror is reflected by the mirror 54 onto the mirror 56 which directs the light to the NIR filter 58. The outer extremes of the NIR image are indicated by the dotted lines 60 and 62. The output of the CCD camera is again supplied on the line 60 to signal processing equipment 64.

The invention may be utilized for other applications by replacing the NIR-pass and red-pass filters with filters which allow for the passage of other wavelengths. For example, the wavelengths selected by the Osthues patent could be utilized merely by providing the correct filter to provide the wavelengths specified in that patent.

Figure 6:
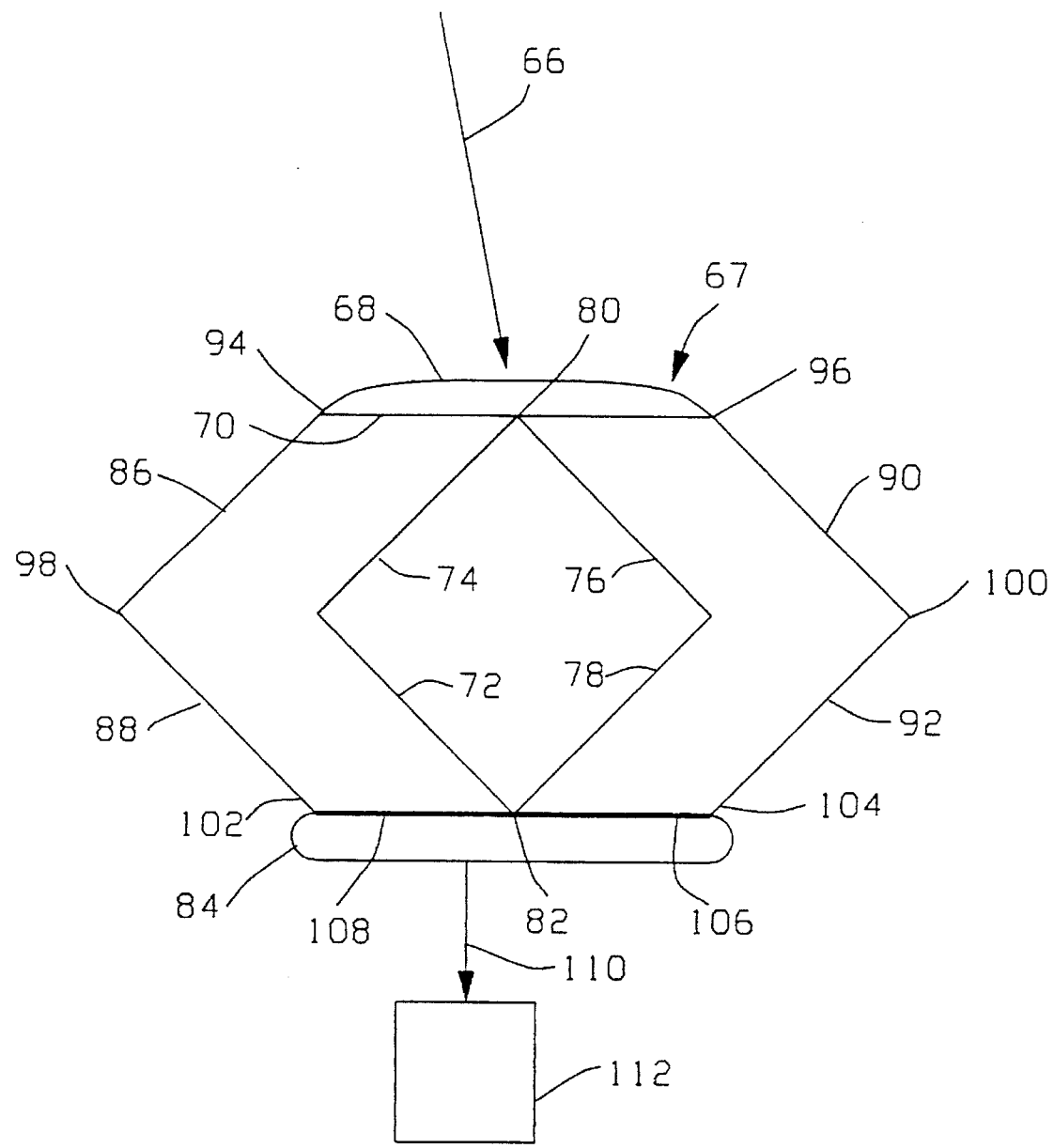
FIG. 6 is a side view of a telescopic optical splitter which shows a lens, eight mirrors, an NIR filter, a red filter in a CCD camera array.

For purposes such as detecting camouflage or images of plants or other objects at a long range, a telescope or narrow-angled device may be constructed in accordance with FIG. 6. In this embodiment the incoming light beam 66 is passed through a lens 67 which has a convex outer surface 68 and a flat inner surface 70. In this configuration, there are four mirrors 72, 74, 76 and 78, which are located in the interior of the optical device. As illustrated in the side views of FIG. 6, these mirrors form a rectangular structure with the flat surface of the mirrors pointing into the paper. One corner 80 of this rectangular configuration of mirrors is positioned adjacent the flat surface 70 of the lens 67, and the opposite corner 82 is positioned adjacent to the CCD camera 84 where the filters 106 and 108 meet.

There are four other mirrors 86, 88, 90 and 92 which are positioned as shown in the Figure. The upper edge of the mirrors 86 and 90 touch the extreme ends of the lens 94 and 96, respectively. The mirrors 86 and 88 extend down to the corners 98 and 100. The lower ends of the mirrors 88 and 92 touch the extreme ends of the filters 102 and 14, respectively, and the upper ends extend to the corners 98 and 100, respectively. The red filter 106 is on top of and adjacent to the right end of the CCD camera 84, and the NIR filter 108 lies on the left end of the CCD camera. The output of the CCD camera is sent on the lines 110 to the signal processing system 112 as before.

Another alternate embodiment is shown in FIG. 7. This embodiment may be utilized either for wide-angle viewing or for narrow telescopic angle viewing in accordance with the image optics (not shown) which is utilized between the elements shown in FIG. 7 and the target. In this embodiment an imaging lens 114 is positioned adjacent to and is utilized in conjunction with an NIR filter 116 which is placed between the imaging optics and the lens 114. This directs the NIR image on the right-hand half of the CCD camera array 118.

In a similar manner, the lens 120 is positioned adjacent to and is utilized in conjunction with a red filter 122 which is placed between it and the imaging optics. This directs the red wavelength image onto the left-hand portion of the CCD array 112. Again the output of the CCD array may be processed in accordance with known image processing techniques. The filters 116 and 122 could be located on the opposite side of the lens 114, 120, respectively, if desired.

In accordance with the teaching of the present invention, various alternatives within the scope of the invention may be devised by those skilled in the art. In particular, the colors of the respective filters may be varied and may be other than red or NIR. The CCD array may be split into more than two portions so that three or more, separate, or overlapping, images may be formed on the CCD array in order to derive various relationships of the filtered images to each other. Such variations and modifications enable the invention to be adapted to images and modifications that do not depart from the scope of the claimed invention so that the invention may be utilized for the detection and differentiation of various objects in an imaged target area.

The lens designs can also be thin film types. These lens are known as holographic, Fresnel or binary optics. In some CCD cameras, each pixel has one of these thin film lenses bonded to it.

We claim:

1. An optical image sensor means for receiving a sensed light image comprising:

a plurality of planar sensing means located in a first plane, each of said sensing means being capable of providing an output signal that is representative of an optical frequency passband beam that impinges thereon, a plurality of optical filter means located in a second plane adjacent said first plane, and each of said optical filter means is located to receive one of a plurality of split optical image beams and to provide an optical frequency passband beam to only one of said sensing means, an optical beam-splitting means positioned to receive an optical image beam and to split said optical image beam into said plurality of split optical image beams that are each substantially identical in frequency composition and are each directed along independent paths such that each of said plurality of split optical image beams impinges upon a respective one of said optical filter means, wherein all of said optical filter means are positioned adjacent said optical beam-splitting means without any intervening air space between said filter means, and said optical beam-splitting means, and said optical beam-splitting means comprises a block of optically transparent material and a plurality of non-dichroic mirrors that are attached to said block without any intervening air space so that said split optical image beams are received and passed through said block to their respective optical filter means without any intervening air space.

2. An optical image sensor means as claimed in claim 1 wherein said optical image sensor means further comprises lens means positioned to receive said optical image beam and to direct said optical image beam into said block.

3. An optical image sensor as claimed in claim 2 wherein said lens means is attached to said block without any intervening air space.

4. An optical image sensor as claimed in claim 3 wherein said lens is divided by said plurality of mirrors so as to form said plurality of split optical image beams such that each of said plurality of split optical image beams is confined into its own independent channel in said block so as to be directed to a respective one of said filter means and each of said filter means supplies an optical frequency passband that corresponds to the split optical image beam that is received by said respective filter means.

5. An optical image sensor as claimed in claim 4 wherein each of said sensing means of said plurality of sensing means comprises an independent sensing area of a single planar charge-coupled sensing device for receiving one of said optical frequency passband image beams.

6. An optical image sensor means as claimed in claim 5 wherein a first one of said optical filter means provides a red optical frequency passband image beam to a first sensing area of said charge-coupled sensing device, and a second one of said optical filter means provides a near-infrared optical frequency passband image beam to a second sensing area of said charge-coupled sensing device.

7. An optical image sensor means as claimed in claim 1 wherein a first one of said optical filter means provides a red optical frequency passband image beam to a first sensing means, and a second one of said optical filter means provides a near-infrared optical frequency passband image beam to a second sensing means.

8. An optical image sensor as claimed in claim 1 wherein each of said sensing means of said plurality of sensing means comprises an independent area of a single sensing device.

9. An optical image sensor means as claimed in claim 8 wherein a first one of said optical filter means provides a red optical frequency passband image beam to a first sensing means, and a second one of said optical filter means provides a near-infrared optical frequency passband image beam to a second sensing means.

* * * * *